United States Patent [19]

Noorlander

[11] 3,967,587

[45] July 6, 1976

[54] TEAT CUP INFLATION

[76] Inventor: Daniel O. Noorlander, 1864 S. 568 East, Orem, Utah 84057

[22] Filed: Dec. 13, 1972

[21] Appl. No.: 314,775

[52] U.S. Cl. .......................... 119/14.49; 119/14.52
[51] Int. Cl.² ............................................ A01J 5/04
[58] Field of Search ....................... 119/14.47–14.53

[56] References Cited
UNITED STATES PATENTS

| 766,847 | 8/1904 | Sharples | 119/14.52 |
|---|---|---|---|
| 1,312,941 | 8/1919 | Anderson | 119/14.52 |
| 2,340,295 | 2/1944 | Bender | 119/14.52 |
| 3,079,891 | 3/1963 | Miller | 119/14.50 |
| 3,659,558 | 5/1972 | Noorlander | 119/14.49 |
| 3,661,120 | 5/1972 | Siddall | 119/14.49 |

FOREIGN PATENTS OR APPLICATIONS

| 1,208,679 | 10/1970 | United Kingdom | 119/14.49 |

*Primary Examiner*—Hugh R. Chamblee
*Attorney, Agent, or Firm*—Charles R. Fay

[57] ABSTRACT

A teat cup inflation for the prevention of mastitis comprising a generally cylindrical shell having a liner therein, an upper or proximate portion of which is stainless steel, the lower distal portion being transparent for observation of the action of the liner. The liner comprises an elastometric one-piece, molded elongated member having at the proximate end an integral flange disposable about the end of the stainless steel portion of the shell; and having a diaphragm with a teat opening therein with a corrugated or accordion type edge for ease of admission of the teat and for better holding, said liner then depending in a generally non-circular e.g., square configuration, which ensures proper massaging action and at the same time, even as the liner collapses, an anti-peristaltic orifice connecting the milking vacuum to the inflation cavity, in combination with a vent below the non-circular configuration that prevents the flooding of milk and backflow of milk and the peristalsis-like conversion of milk backward against the teat orifice.

4 Claims, 6 Drawing Figures

TEAT CUP INFLATION

BACKGROUND OF THE INVENTION

Attention is directed to my copending application Ser. No. 21,812, filed Mar. 23, 1970, now U.S. Pat. No. 3,659,558, in which there is generally specified the inadequacies of the prior art, particularly as to incorrect massaging, and the cups thereof which are inadequately designed and which result in inadequate decongesting of the teat and pinching. The causes of mastitis are generally enumerated therein, and this invention improves the constancy of vacuum and lessens damage to the teats, as well as lessening the transfer of mastitis, and "Staph" bacteria.

At least one-half of the dairy cows in the United States are infected with mastitis and many with staph, and as a matter of fact much milk is sold completely illegally because it is not pure. It is the principal object of the present invention to provide an inflation which will reduce the mastitis and other bacteria.

One of the causes of mastitis is inadequate sizing of the teat opening in the liner so that it tends to slip one way or the other. If the teat slips down inwardly with respect to the liner, the massaging action is changed in such a way as to injure the teat, and also the backflow of the milk will contact the teat allowing bacteria to impinge upon the teat. Flooding will interfere with proper vacuum preventing proper teat massage without which the end of the teat may be injured. On the other hand, if the teat starts to slip out of the cup, it will tend to fall off. It is the object of the present invention among others to provide a teat cup which will not allow the teat to slip in any direction once properly positioned with the teat only part way into the liner, it being well known that the teat should extend only into the upper part of the liner and not into the lower part thereof. Attention is invited to a publication by the applicant entitled "Mastitis Control Manual", published by IBA Inc., Millbury, Mass.

SUMMARY OF THE INVENTION

In the present case the inflation comprises a stainless steel cylinder forming the top (proximate) portion of the shell, and a detachable plastic or glass transparent lower or distal end is provided, for attachment to the milking machine, the transparent portion having a reduced lower end portion for abutment against a corresponding abutment on the liner. The liner is a one-piece molded elastometric member and the portion thereof which is located within the shell is of noncircular cross section and has in general reenforcing rib means, and is so designed as to provide an elongated anti-peristaltic orifice throughout the same connecting the milking vacuum to the inflation cavity immediately below the end of the teat. At the upper or proximate end of the liner it is provided with a reversely extending integrally molded flange which fits over the upper or proximate open end of the stainless steel cylinder and engages the same, and providing a teat opening centrally thereof, said teat opening appearing in an integral diaphragm or the like at the upper end of the noncylindrical portion of the liner, see my patent application above referred to. The opening has e.g., a corrugated or reduced edge providing for greater flexibility for the easy insertion of the teat into the cup and to retain the teat in position forming a slight vacuum seal but not so tight as to restrict the flow of blood or a slight ingress of air to collapse the teat wall to prevent vacuum from extending into the teat cavity when the cow is through milking. Also, the non-circular section of the liner provides a leverage against the teat longitudinally thereof which improves the very necessary blood circulation. That is, the section is square and dimentioned to press the teat on convergent surfaces tapering down toward the end of the teat.

PREFERRED EMBODIMENT OF THE INVENTION

Figure 1:
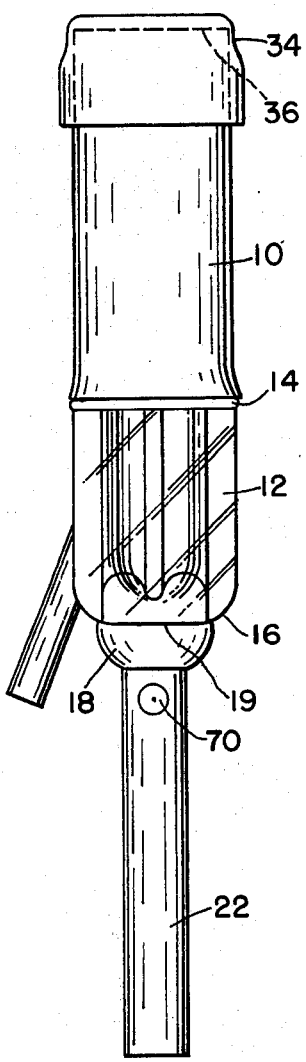
FIG. 1 is a view in elevation illustrating the new teat cup inflation.

Referring now to FIG. 1, there is shown the complete assembled inflation. A stainless steel shell portion 10 in this case is preferably cylindrical and is open at both ends. At its lower end, it slips over and frictionally is secured to a glass or clear plastic lower portion of the shell indicated at 12, there being an O-ring 14 between the two parts to provide against any kind of leakage.

Figure 2:
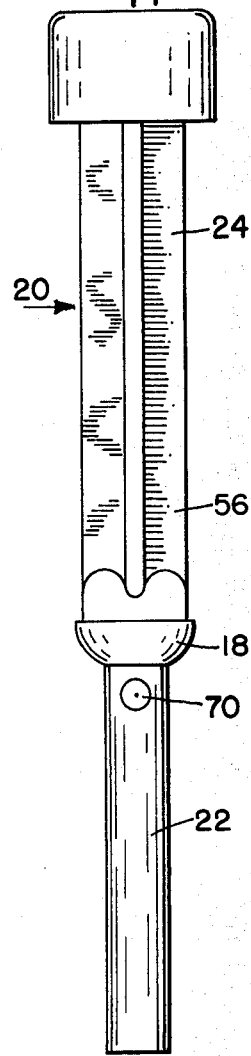
FIG. 2 is a view in elevation of the liner.
Figure 3:
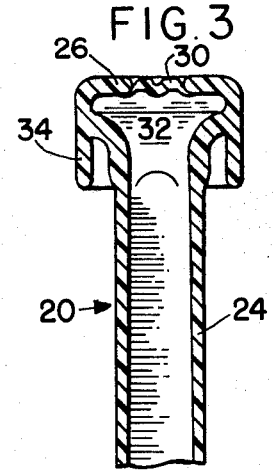
FIG. 3 is a vertical section through the top portion of the liner.

The clear lower portion 12 of the shell is reduced at its lower end portion 16 and has an open edge or rim 19 which abuts firmly against an enlarged abutment portion 18 of the liner generally indicated at 20, see FIG. 2.

Figure 4:
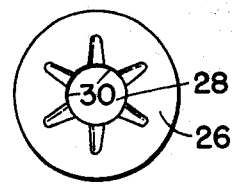
FIG. 4 is a top plan view of the liner.

The inflation comprises the milk tube outlet 22, the abutment 18, and a non-circular e.g., square liner section generally indicated at 24, which will later be described in more detail. The section 24 terminates in the proximate or upper end portion thereof and an integrally molded diaphragm or the like 26 having a teat opening 28 which has a corrugated edge as clearly shown in FIG. 4 at 30. This edge could be made in many different ways as by means of an accordion pleat, slits arranged in the proper manner, etc. There is an enlargement which is indicated at 32 and the diaphragm at 26.

A flange 34 can be designed to fit over the open end at 36 of the stainless steel tube 10, but there are other satisfactory joints. After this has been done, the milk tube 22 is pulled down to bring the abutment 18 into contact with the rim 19 of the visible part 12 and allowing it to snap back to engage the rim 19 of the transparent portion 12 of the inflation firmly seating the same in position.

Figure 5:
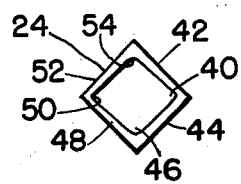
FIG. 5 is a horizontal section through the inflation.

Referring now to FIG. 5 where the rectangular portion 24 of the liner is shown, it is important to note that the interior configuration is not uniform, whereas the exterior configuration may be square if desired.

For instance, the angle at 40 between side walls 42 and 44 is less than the angle at 46 which forms a side wall between walls 44 and 48. The angle at 50 between walls 48 and 52 may be the same as at 40 and also the angle at 54 may be the same as the angle at 46 but this is not strictly necessary, the relationship between angles 40 and 50 and angles 46 and 54 being the important consideration.

Figure 6:
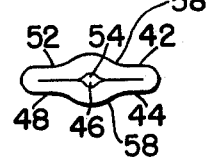
FIG. 6 is a similar view showing the inflation collapsed.

With the above construction in view, attention is directed to FIG. 6 in which the liner is shown inflated, with walls 42 and 44 contacting and walls 48 and 52 contacting, the enlarged angles at 46 and 54 forming the anti-peristaltic opening which is always present whether the liner is almost worn out or not.

It will also be noted that the wall thickness tapers down from the angles 46 and 54 to the angles 40 and 50 which provides for an easier collapse from the inflated to the non-inflated conditions thereof. At the same time the upper part of the square liner cannot collapse because the teat is located therein. This ensures the optimum massage and uniform pressure action which is necessary to adequately provide blood circulation so as to protect the teat and also any mechanical injury. This is because the collapse of the square liner presses on the teat along surfaces convergent toward the end of the teat.

The soft corrugated edge portion of the teat opening in the diaphragm is such as to lightly but firmly engage almost any size of teat and keep it in the position desired so that it neither tends to fall off nor restrict blood circulation or milk outflow.

Looking at FIG. 6, the walls 42, 44, 48, and 52 are shown fully collapsed and this occurs in the area at 56 just below the cow's teat in the inflation liner, see FIG. 2. The teat itself prevents complete collapse as indicated at 58, 58 in FIG. 6, and the pressure on the teat is in the form of a kind of leverage, the side walls 42, 52, approaching side walls 44, 48 on convergent lines tapering from the top downwards. This gives the very important improved massage.

Attention is also directed to my U.S. Pat. No. 3,476,085 dated Nov. 4, 1969, relating to the use and necessity of the vent and in the present case this vent is indicated at 70 and its operation is substantially the same as in my U.S. Pat. No. 3,476,085. In order for the inflation of the present invention to operate properly to prevent disease and transmission of bacteria, the vent is necessary as is also the anti-peristaltic opening shown in FIG. 6 when the inflation is being closed, and the corrugated opening in the diaphragm 26, as well as the noncircular or square section of the liner as at 24, it being emphasized that the cow's teat is entered into the inflation only in the upper portion thereof.

The corrugation is particularly important when using a liner having a bore of e.g., 0.75" and a periphery of approximately 2.5" which are essentially the optimum dimensions of the present device. Thus this liner is designed with a small bore that keeps it down off the udder, as otherwise the liner will tend to creep upwardly. The diameter of the corrugated teat opening is less than the diameter of the liner and this enhances its effectiveness.

The teat cup shell including the lower visible portion and the stainless steel upper portion provides adequate weight which is necessary for a device of this nature. With the entire shell made of plastic or glass there is not sufficient weight to ensure proper closure of the milk tube over the milk tube ferrule when one cup is removed from the teat, e.g.

On the other hand, the visible section at 12 allows inspection of the interior so that the attendant is enabled to see the movement of the liner and whether water is present, and at the same time he can easily see whether the inflation section 24 has become twisted. Any twist in this section results in a malfunction of the device.

I claim:

1. A teat cup assembly comprising a shell and an inflation, the shell including two interconnected sections, one of which is of stainless steel and the other being transparent, the stainless steel section being at the proximate end of the shell and the transparent section being at the distal end thereof, the inflation comprising a one-piece elastomeric member including a liner and a milk tube extending therefrom and through the shell, means on the inflation engaging the shell at the proximate end of the stainless steel section, and there being an abutment on said inflation between the liner section and the milk tube against which the distal end of the transparent section of the shell abuts.

2. An inflation comprising a milk tube and a generally square sectioned liner section including four walls with included angles, certain of said angles being less than other angles to require that the square liner section collapses in a certain predetermined manner so as to provide uniform pressure exerted on all sides of the teat wall, and also providing a leverage action on the long axis of the teat improving blood circulation and leaving an anti-peristalic opening therethrough, certain walls of the square section of the liner tapering transversely of the liner section from one angle to the next two adjacent angles, the material of the liner section being thicker at said one angle and thinner at the adjacent angles.

3. The inflation of claim 2 wherein the opposite walls of the liner taper the same way in reverse.

4. A teat cup assembly comprising a shell and an inflation, the shell comprising a one-piece molded elastomeric member including a milk tube having a detachable connection with respect to the distal end of the shell, the inflation including a liner section of substantially square conformation, section taper square section comprises four walls with included angles, two opposite angles being less than the remaining two opposite angles, and the walls of the square section taper transversely from two opposite angles to the other two opposite angles, becoming narrower in thickness and causing the square section of the liner to collapse about the axis of the lesser angles, the two larger angles being enlarged upon collapse thereof to form an anti-peristalic opening at every collapse, and a vent in the milk tube below the shell.

* * * * *